US005375313A

United States Patent [19]

Apodaca et al.

[11] Patent Number: 5,375,313

[45] Date of Patent: Dec. 27, 1994

[54] DEVICE FOR THE REMOVAL OF A LINER BOLT FROM A SAG MILL

[75] Inventors: John Apodaca, San Luis; Mike Bohl, Blanca; Moises Cordova, Garcia; Denny Gonzales, San Luis, all of Colo.; Louie Lucero, Amalia, N. Mex.; Jesse Martinez, San Pablo, Colo.; James Mascarenas, Chama, Colo.; Leonard Quintana, San Luis, Colo.

[73] Assignee: Battle Mountain Gold Company, Houston, Tex.

[21] Appl. No.: 219,279

[22] Filed: Mar. 29, 1994

[51] Int. Cl.[5] .................. B23P 19/06

[52] U.S. Cl. .................. 29/252; 29/254; 29/426.5; 173/33

[58] Field of Search .................. 29/426.4, 426.5, 254, 29/255, 275, 252; 173/33, 34, 32

[56] References Cited

U.S. PATENT DOCUMENTS

| | | | |
|---|---|---|---|
| 3,576,064 | 4/1971 | Brackin | 29/254 |
| 4,451,959 | 6/1984 | Miller et al. | 29/426.4 |
| 5,323,524 | 6/1994 | Stilwell | 29/254 |

FOREIGN PATENT DOCUMENTS

| | | | |
|---|---|---|---|
| 1516291 | 10/1989 | U.S.S.R. | 29/426.5 |

*Primary Examiner*—Mark Rosenbaum
*Assistant Examiner*—David P. Bryant
*Attorney, Agent, or Firm*—Harrison & Egbert

[57] ABSTRACT

A device for the removal of a liner bolt from a SAG mill including a support member for affixing to an exterior surface of the SAG mill and a ram affixed to the support member and having an end movable relative to the support member. The end serves for compressive abutment with a surface of a liner bolt. The support member includes a first arm, a second arm, and a strut connected to the first and second arms. The ram is affixed to the strut. A first bolt receptacle is formed on an end of the first arm and a second bolt receptacle is formed on an end of the second arm. The ram includes a cylindrical member affixed to and extending downwardly from the support member, a circular frame affixed to the support member and rigidly affixed to the cylindrical member, and a hydraulic ram having a body received within the cylindrical member.

13 Claims, 4 Drawing Sheets

DEVICE FOR THE REMOVAL OF A LINER BOLT FROM A SAG MILL

TECHNICAL FIELD

The present invention relates to bolt removal devices. More particularly, the present invention relates to devices and methods for the removal of liner bolts from SAG mills.

BACKGROUND ART

A SAG ("Semi-Autogenous Grinding") mill is a cylindrically shaped grinding reduction plant of both variable diameter and length. Typically the length and diameter of such a mill have dimensions in tens of feet. The SAG mills are widely used throughout the minerals extractive industry to reduce a mineral ore of an intermediate size (approximately six inches of diameter) to less than one-eighth inch of diameter. The SAG mill accomplishes this reduction through a combination of direct impact fracturing and rotational grinding attrition. This process of reduction begins by the mineral ore being introduced into the SAG mill through a feed chute or hopper. The SAG mill is normally rotating at a relatively low rate of turn (revolutions per minute) as the ore is fed. Hardened steel balls are added to the ore feed and coupled with available larger ore particles so as to provide both direct fracturing and ore grinding attrition. The mill is designed to retain the ore until a desired product size is achieved. At this point, the ground ore is discharged through an internal port, and exits the mill for further benefication.

The nature of the intense fracturing and grinding that occurs in the SAG mill requires that the mill shell be protected to prevent deterioration. This is accomplished by lining the mill with bolted plate liners of variable size (typically five feet long by one and a half feet wide and several inches thick). These plate liners are typically made of hardened steel to effect lengthened wear rates (liner life). Further, the liners are axially cast with a raised center (lift bar) of up to four inches in length (five feet long and eight inches wide). The weight of a typical liner plate can approach 2200 pounds. There can be many tens to well over 100 liner plates installed within a SAG mill.

As the mill liner plates wear, replacement becomes necessary. This is done to protect the interior mill shell liner and to improve the efficiency of the mill by increased material lift via the new liner lift bars.

Replacement of the liner plates requires that the mill be taken out of service, the nut ends on the threaded one inch liner bolts be removed, and the liner bolts punched inwardly toward the mill. The worn liners are sequentially removed and new liners placed and bolted.

Difficulties, in the past, have occurred in trying to punch the mill liner bolts inwardly toward the mill interior. These difficulties are due to two circumstances unique to the design of the mill plate liners and attaching liner bolts. First, the liner plate typically is attached with three bolts. Each bolt can measure one inch in diameter by eighteen inches in length. The liner bolt head is a flattened "Y-end" (eared) bolt designed to set into a tapered ellipsoid hole in the liner plate. As the liner bolt is nutted and tensioned from the exterior mill shell, the bolt head seats and tensions into the tapered ellipsoid hole. As the liner wears, debris (e.g. steel ball chips, rock chips, etc.) sets into the ellipsoid bolt hole. Further, the bolt hole tends to peen over so as to develop inwardly-directed edges. This results in a "locking" of the debris within the hole and prevents easy removal of the liner bolt past the peened bolt hole.

Prior practice has been to enlarge the bolt hole during the liner plate replacement process via acetylene torch or air-arcing. Once the hole is enlarged, the bolt is pounded inwardly through the use of a sledge hammer. Unfortunately, this practice has had three major drawbacks. First, it is extremely labor intensive to physically punch the liner bolt through the liner plates. It is also very time consuming to physically enlarge the peened liner plate holes. Secondly, the lengthy process of the "sledge hammer" removal of the bolt causes up to fifty hours of down time of the SAG mill. This long period of down time can be very costly to the processing of ore and can severely interrupt the process of mineral extraction. Thirdly, the use of cutting torches within the mill presents a ventilation concern and a fume exposure problem to laborers.

It is an object of the present invention to provide a device and method for the removal of liner bolts that reduces he amount of labor required for the removal of such bolts.

It is an object of the present invention to provide a device for the removal of liner bolts that reduces the time required to remove the liner bolts from the SAG mill.

It is another object of the present invention to provide a device and method for the removal of liner bolts that creates no ventilation or fume concerns or requires no liner plate hole enlargement.

It is still another object of the present invention to provide a device for the removal of liner bolts that is relatively easy to manufacture, easy to use, and relatively inexpensive.

These and other objects and advantages of the present invention will become apparent from a reading of the attached specification and appended claims.

SUMMARY OF THE INVENTION

The present invention is a device for the removal of liner bolts from a SAG mill which comprises a support means for affixing to an exterior surface of the SAG mill, and a ram means affixed to the support means. The ram means has an end which is movable relative to the support means for compressive abutment with a surface of the liner bolt. The support means includes a first arm, a second arm, and a strut connected to the first and second arms. The ram means is affixed to the strut. The first arm extends outwardly at an obtuse angle from the strut. Similarly, the second arm extends outwardly at an obtuse angle from the strut. A first bolt receptacle is formed on an end of the first arm for removable attachment to a second liner bolt of the SAG mill. A second bolt receptacle is formed on an end of the second arm for removable attachment to a third liner bolt of the SAG mill. The first bolt receptacle is a first hole which is formed on a surface at an end of the first arm. The second bolt receptacle is a second hole formed on a surface at an end of the second arm. The first and second holes are symmetrically positioned relative to the ram means. The surfaces of the first and second arms are inclined so as to conform to a circumference of the SAG mill. Each of the first and second holes has an ellipsoid configuration. The strut is positioned at an end of the first and second arms and extends horizontally.

An eyelet is affixed to and extends outwardly from one of the first and second arms.

The ram means specifically includes a cylindrical member which is affixed to and extends downwardly from the support means. The cylindrical member serves to receive a hydraulic ram thereon. A circular frame is affixed to the strut and is also rigidly affixed to the cylindrical member. A hydraulic ram has a body which is received within the cylindrical member and has the abutment end extending outwardly from the cylindrical member. A restraining belt is connected to the hydraulic ram and serves to affix the hydraulic ram within the cylindrical member.

The present invention is also a method for the removal of liner bolts from a SAG mill liner plate. This method includes the steps of: (1) forming a support member having a first arm and a second arm extending downwardly and outwardly from a central strut, (2) affixing a ram to the central strut of the support member; (3) removing a nut from a first liner bolt on an exterior of the shell; (4) affixing the first and second arms to other liner bolts such that the abutment end of the ram is adjacent an end of the first liner bolt; and (5) actuating the ram such that the abutment end pushes the first liner bolt from the shell.

The step of affixing the first and second arms specifically includes the steps of removing a nut from an end of the second liner bolt exterior of the shell, positioning a hole on the bottom surface of the first arm over the end of the second liner bolt, and attaching the nut onto the end of the second liner bolt such that the bottom surface of the first arm is interposed between the nut and the shell. With respect to the second arm, a nut is removed from an end of a third liner bolt on an opposite side of the first liner bolt from the second liner bolt, a hole on the bottom surface of the second arm is positioned over an end of the third liner bolt, and the nut is reattached onto an end of the third liner bolt such that the bottom surface of the second arm is interposed between the nut and the shell. The first liner bolt, the second liner bolt, and the third liner bolt are circumferentially aligned on the shell.

The method of the present invention further includes the steps of: (1) removing the first and second arms from the other liner bolts after the step of actuating; and (2) moving the support member to another position on the shell such that the abutment end is adjacent to a different liner bolt than the first liner bolt.

The step of removing includes the steps of removing the nut from the end of the second liner bolt, and lifting the support member such that the hole on the bottom surface of the first arm separates from the second liner bolt.

DETAILED DESCRIPTION OF THE INVENTION

Figure 1:
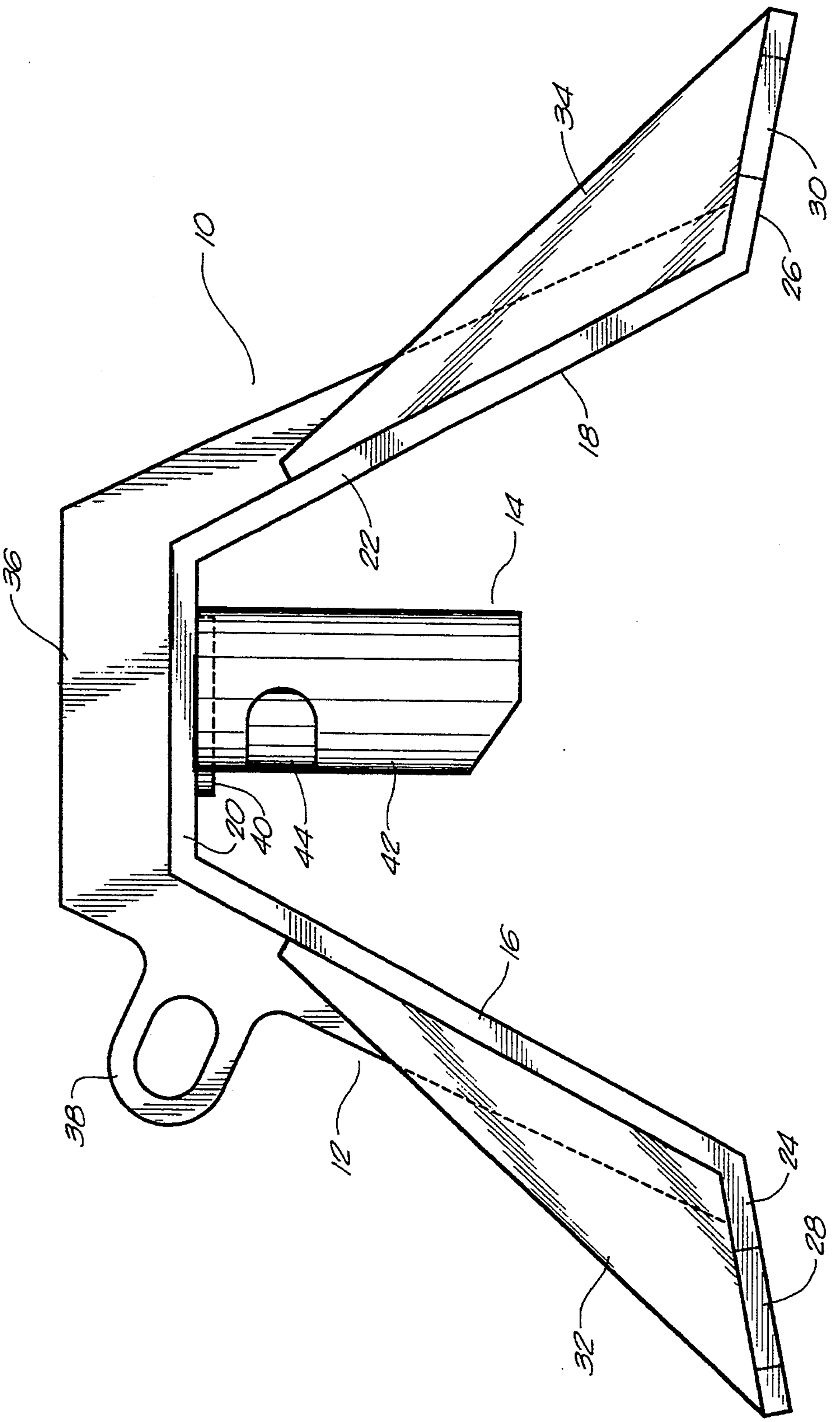
FIG. 1 is a front elevational view of the device of the present invention.

Referring to FIG. 1, there is shown at 10 the device for the removal of liner bolts from a SAG mill. The device 10 includes a support member 12 and a ram member 14. The support member 12 is used by affixing it to an exterior surface of the SAG mill. The ram member 14 is affixed to the support member 12 and extends vertically downwardly therefrom. The ram member 14 serves to receive a hydraulic ram which has an end movable relative to the support member 12 for compressive abutment with a surface of a liner bolt.

The support member 12 has a main frame 22 including a first arm 16, a second arm 18, and a strut 20. The strut 20 is connected to the first arm 16 and the second arm 18. The ram member 14 is affixed to the bottom surface of a strut 20. The first arm 16 extends outwardly from the strut 20 at an obtuse angle. The main frame 22 extends around and forms the first arm 16, the second arm 18, and the strut 20. In other words, the arms 16 and 18 and the strut 20 are portions of the main frame 22. The first arm 16 has an end surface 24. Similarly, the second arm 18 has an end surface 26 formed thereon. A bolt receiving receptacle 28 is formed in the end surface 24 of the first arm 16. Similarly, a second bolt receptacle 30 is formed in the end surface 26 of the second arm 18. It can be seen that the end surfaces 24 and 26 are inclined relative to the arms 16 and 18, respectively. This angle of inclination will depend upon the circumference of the SAG mill. The bolt receiving receptacles 28 and 30 are formed on the interior of the end surfaces 24 and 26, respectively. As will be described hereinafter, each of the bolt-receiving receptacles 28 and 30 have an ellipsoid configuration. A support flange 32 is welded to the first arm 16 so as to extend from the first arm 16 to the end surface 24. The support flange 32 is specifically welded to the first arm 16 so as to provide the necessary rigidity and stability to the arm 16. Similarly, a second support flange 34 is welded to an outer surface of the second arm 18 and to the end surface 26. The support flange 34 is positioned on the second arm 18 so as to provide the necessary structural stability and rigidity to the frame 22. Another flange section 36 is welded to the surface of the frame 22 and extends around the first arm 16, the strut 20, and the second arm 18. The flange section 36 is positioned on the exterior of these arms and the strut and extends therearound in an upside-down U-shaped configuration. The flange section 36 extends around the main frame 22 so as to provide structural rigidity to the frame 22. An eyelet 38 is formed in the flange section 36 and extends outwardly from the first arm 16. The eyelet 38 serves as a connection for various lift devices so as to facilitate the use and transportation of the device 10. It should be noted that the eyelet 38 can also be positioned, if necessary, on the side of the flange section 36 corresponding to the second arm 18.

The strut 20 extends generally horizontally between the first arm 16 and the second arm 18. The ram member 14 is affixed to the bottom surface of the strut 20 and is positioned generally centrally between the first arm 16 and the second arm 18. A circular frame 40 is welded to the bottom surface of the strut 20. A cylindrical member 42 is affixed to the circular frame 40 and extends downwardly from the support member 20. The cylindrical member 42 serves to receive the hydraulic ram therein. The cylindrical member 42 includes a slot 44 formed therein. The slot 44 allows hose attachments to the hydraulic ram to extend outwardly from the cylindrical member 42.

Figure 2:
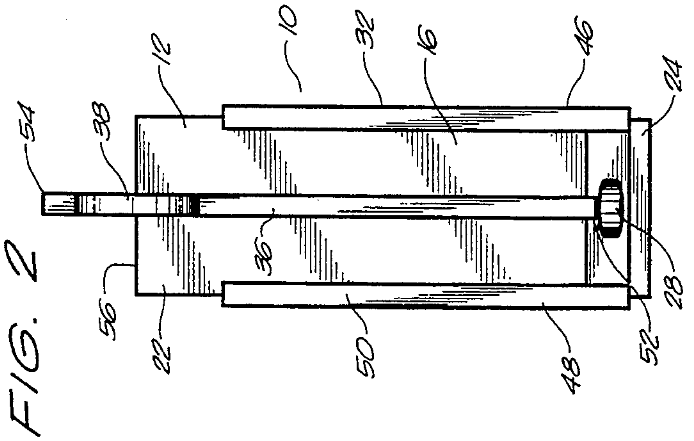
FIG. 2 is a side elevational view of the device of the present invention.

FIG. 2 shows a side view of the device 10. In particular, the first arm 16 of the support member 12 is particularly illustrated in the view of FIG. 2. It can be seen that the first arm 16 has the end surface 24 formed on a bottom of the arm 16. The first bolt receptacle 28 is formed centrally on the end surface 24 between the sides 46 and 48. The first bolt receptacle 28 is an elongated hole. The elongation of the hole 28 is designed so as to allow the hole 28 to be adapted to slight variations in the position of the corresponding liner bolts on the SAG mill liner plates.

In FIG. 2, it can be seen that the first arm 16 is a relatively wide member. The flange 32 extends along side 46 of the first arm 16. Another flange 50 extends along the side 48 of the arm 16. The flanges 32 and 50 terminate at the end surface 24. The first bolt receptacle 28 is positioned between the flanges 32 and 50. The flange section 36 extends centrally between the flanges 32 and 50. The end 52 of flange section 36 terminates adjacent to the first bolt receptacle 28. The eyelet 38 is formed adjacent to the top 54 of the flange section 36. The flange section 36 extends upwardly above the top edge 56 of the frame 22 of device 10. The relatively wide surface of the arm 16 and the frame 22, along with the configuration of the flanges 32 and 50 and the flange section 36 provides the device 10 with sufficient strength and rigidity to support the removal of the liner bolt from the SAG mill.

Figure 3:
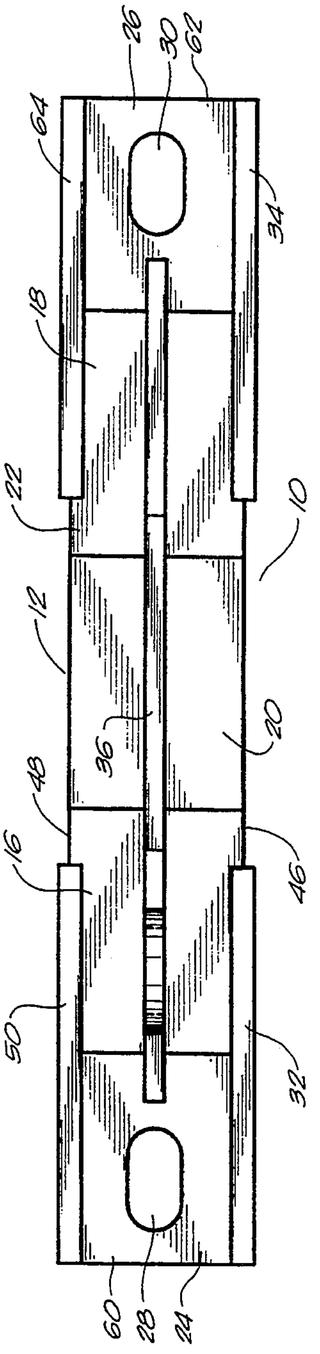
FIG. 3 is a plan view of the device of the present invention.

FIG. 3 illustrates a top view of the device 10 of the present invention. In particular, the support member 12 of the present invention is fully illustrated. Initially, it can be seen that the frame 22 has a generally linear configuration extending from a first end 60 to a second end 62. The strut 20 is formed centrally of the frame 22. Importantly, as can be seen, the first bolt receptacle 28 and the second bolt receptacle 30 are ellipsoid holes which are arranged symmetrically relative to the strut 20. The holes 28 and 30 are also positioned equidistant between the sides 46 and 48 of the frame 22. The first bolt receptacle 28 is positioned on the end surface 24 of the first arm 16. Similarly, the second bolt receptacle 30 is positioned on the end surface 26 of the second arm 18. Each of the bolt receptacles 28 and 30 are positioned inwardly of the ends 60 and 62, respectively, of the frame 22.

The first arm 16 shows that the flanges 32 and 50 are positioned on each of the sides 46 and 48 of the frame 22. The second arm 18 has flanges 34 and 64 positioned on the sides 46 and 48, respectively. The flange section 36 is positioned equidistant between the sides 46 and 48 and extends along The frame 22 between the bolt receptacles 28 and 30. The ram member 14 is positioned on the opposite side of the strut 20 from the flange section 36.

Figure 4:
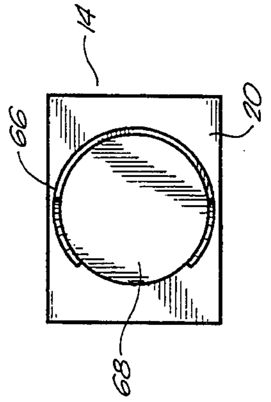
FIG. 4 is a bottom view of the ram means of the device of the present invention.

FIG. 4 illustrates the ram member 14. Specifically, FIG. 4 shows the ram member 14 as positioned on the underside of the strut 20 of the support member 12. The ram member 14 includes a cylindrical member 66 which is positioned on the strut and configured so as to receive a hydraulic ram. It can be seen that the cylindrical member 66 is partially cylindrical and extends around a circular frame 68. A circular frame 68 is affixed to the strut 20 of the support member 12. The inner edges of the cylindrical member 66 are affixed to the circumference of the circular frame 68.

Figure 5:
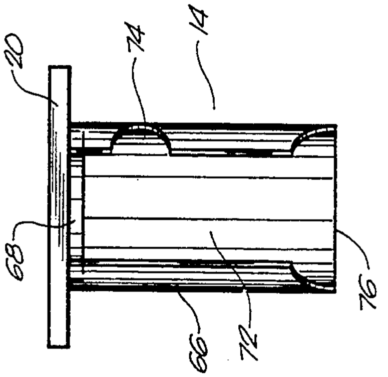
FIG. 5 is an isolated side view of the ram means of the device of the present invention.

FIG. 5 shows the side view of the configuration of the ram member 14. The ram member 14 is affixed to a bottom surface 70 of the strut 20 and extends vertically downwardly therefrom. The ram member 14 is positioned between the ends of the struts 20. In FIG. 5, it can be seen that the cylindrical member 66 extends around the circular frame 68. The circular frame 68 has a top surface which is rigidly affixed (by welding or other techniques) to the bottom surface 70 of the strut 20. The cylindrical member 66 is also affixed to the bottom surface 70 of the strut 20 and is received by the circular frame 68. The cylindrical member 66 has an interior area 72 suitable for the receipt of a hydraulic ram therein. A slot 74 is formed in the cylindrical member 66 so as to allow for the passage of hoses, and other items, from the hydraulic ram positioned within the interior area 72 of the cylindrical member 66. The abutment end of a ram positioned within the interior area 72 will extend downwardly from the bottom 76 of the cylindrical member 66. A restraining member, such as a belt or a chain will extend around the circumference of the cylindrical member 66 so as to rigidly secure the hydraulic ram within the interior area 72.

Figure 6:
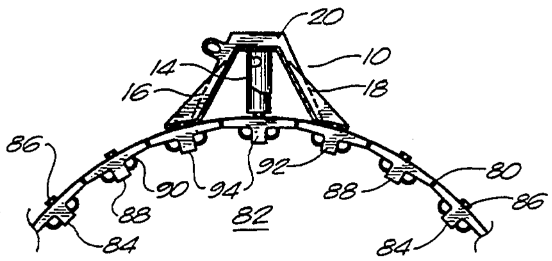
FIG. 6 is an illustration of the positioning of the device of the present invention on a SAG mill.

FIG. 6 illustrates the arrangement of the device 10 as positioned on the shell 80 of a SAG mill 82. It can be seen that the shell 80 has a generally cylindrical configuration (illustrated partially in FIG. 6). A plurality of liner plates 84 are affixed to the interior of the mill shell 80. Each of the liner plates 84 has a liner bolt extending therethrough. The threaded end of the liner bolt is affixed by a nut 86 on the exterior of the mill shell 80. Each of the liner bolts will extend through the lift bar 88 on each of the liner plates 84.

In FIG. 6, it can be seen that the first arm 16 of the device 10 is placed onto a liner bolt corresponding to the liner plate 90. The second arm 18 is affixed to a liner bolt corresponding to the liner plate 92. The strut 20 extends between the ends of the arms 16 and 18. The ram member 14 extends downwardly from strut 20 so as to act on the liner bolt corresponding to liner plate 94. In FIG. 6, the arms 16 and 18 are affixed to the liner bolts which are aligned circumferentially around the shell 80. By actuating the ram 14, the abutment end of the ram will serve to push the liner bolt corresponding to liner plate 94 downwardly into the interior of the SAG mill.

Figure 7:
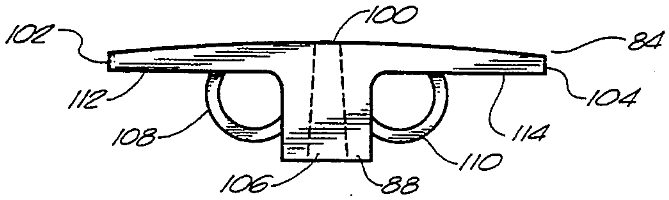
FIG. 7 is an end view of a single liner plate.

FIG. 7 shows an end view of a single liner plate 84. It can be seen that the liner plate 84 has a contoured outer surface 100. The contour of the outer surface 100 will correspond to the contour of the inner diameter of the SAG mill shell 80. The lift bar 88 extends generally perpendicularly to the outer surface 100. The lift bar 88 is located centrally between the ends 102 and 104 of the liner plate 84. The liner bolt will extend a tapered ellipsoid hole 106 (illustrated in dotted line fashion). Eyelets 108 and 110 are formed on opposite sides of the lift bar 88. These eyelets 108 and 110 are attached to the back surfaces 112 and 114, respectively, of the outer surface 100 of liner plate 84. The eyelets 108 and 110 serve to facilitate the lifting and positioning of the liner plate 84 within the SAG mill.

Figure 8:
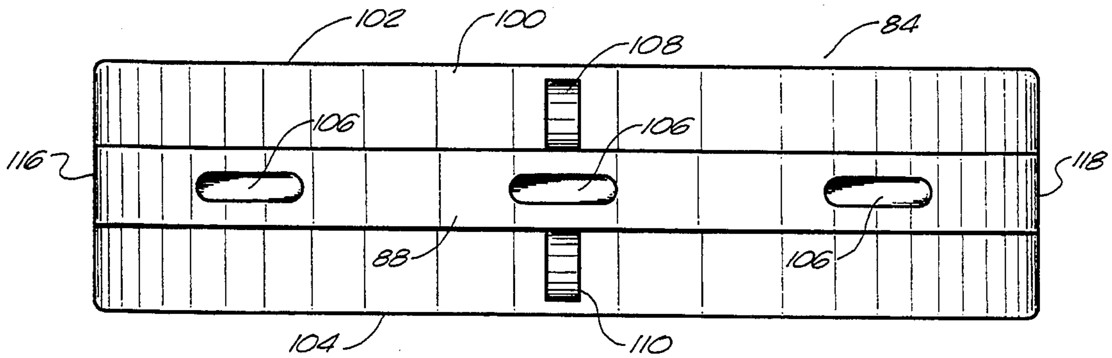
FIG. 8 is a plan view of a single liner plate.

FIG. 8 illustrates the liner plate 84 from a plan view. Specifically, the liner plate 84 has an outer surface 100 having a generally rectangular configuration. Outer surface 100 has sides 102 and 104. When the liner plate 84 is positioned within the SAG mill, the sides 102 and 104 will be in juxtaposition against corresponding sides of adjacent liner plates. The liner plate 84 also has ends 116 and 118. Under certain constructions of a SAG mill, the ends 116 and 118 may be adjacent to the corresponding ends of adjacent liner plates. The lift bar 88 extends centrally of the sides 102 and 104 between the ends 116 and 118. A plurality of ellipsoid holes 106 are formed in the lift bar 88 of the liner plate 84. The configuration of the ellipsoid holes 106 allows the hole to be properly aligned and adapted to the holes formed on the shell 80 of the SAG mill. The liner bolts will extend into the ellipsoid holes 106. Specifically, the head of the liner bolts will be received within the ellipsoid holes 106 while the threaded end of the liner bolts will extend outwardly of the mill shell 80. The eyelets 108 and 110 are positioned on opposite sides of the lift bar 88. The eyelets 108 and 110 are positioned generally centrally between the ends 116 and 118.

Figure 9:
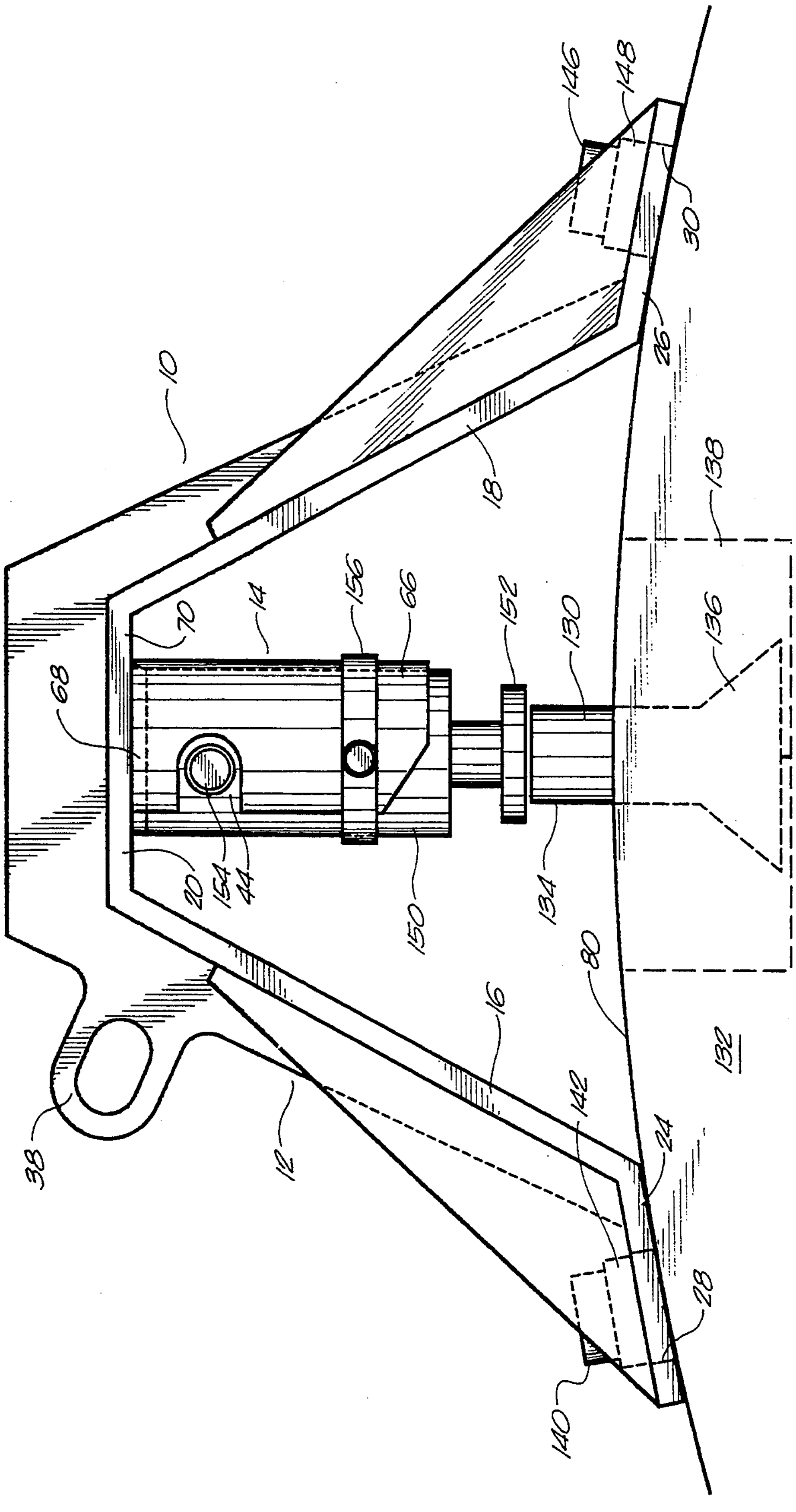
FIG. 9 is a front elevational view showing the arrangement of the present invention as used for the removal of liner bolts from a SAG mill.

FIG. 9 shows the configuration of the device 10 as used for the removal of the liner bolt 130 from the shell 80 of SAG mill 132. In FIG. 9, it can be seen that the liner bolt 130 has a threaded end 134 extending outwardly of the shell 80. The Y-shaped end 136 is positioned within the ellipsoid hole of the liner plate 138 on the interior of the shell 80. In normal use, the threaded end 134 of the liner bolt 130 will have a nut therearound so as to secure the liner bolt 130 to the shell 80 of the SAG mill 132.

The device 10 includes the first arm 16, the second arm 18, and the strut 20 extending therebetween. The first arm 16 has the end surface 24 having an incline corresponding to the circumference of the shell 80. The end surface 24 of the first arm 16 has a bolt receptacle 28 which is secured to a second liner bolt 140 having a threaded end extending outwardly of the shell 80. A nut 142 serves to secure the end surface 24 in juxtaposition against the outer surface of the shell 80. The nut 142 is threadedly received around the threaded end of the liner bolt 140. Similarly, the second arm 18 has its end surface 26 in juxtaposition against the outer surface of the shell 80. The second bolt receptacle 30 of the end surface 26 extends around a third bolt 146 extending outwardly of the shell 80. A nut 148 is positioned around the end of the third liner bolt 146 so as to place the end surface 26 in secured juxtaposition against the shell 80. The end surface 26 will be interposed between the nut 148 and the outer surface of the shell 80.

IN FIG. 9, it can be seen that the arms 16 and 18 extend upwardly at obtuse angles relative to the strut 20. The strut 20 is connected to the arms. 16 and 18 opposite the shell 80. Generally, the strut 20 extends in generally parallel relationship to the surface of the shell 80. The strut 20 is a horizontal member that has the ram member 14 extending vertically downwardly therefrom.

The ram member 14 is positioned centrally between the arms 16 and 18. The ram member 14 has the cylindrical member 66 affixed to the bottom surface 70 of the strut 20. The circular frame 68 is also affixed to the bottom surface of the strut 20. The cylindrical member 66 has a slot 44 formed therein. Importantly, the hydraulic ram 150 is received within the interior of the cylindrical member 66. Hydraulic ram 150 has an abutment end 152 extending outwardly therefrom. It can be seen that the abutment end 152 is in proximity to the end of the liner bolt 130. The hydraulic ram 150 has its hydraulic hose 154 extending outwardly through the slot 44 in the cylindrical member 66. A restraining belt 156 extends around the exterior of the cylindrical member 66 and around a portion of the hydraulic ram 150. The restraining belt 156 serves to secure the hydraulic ram 150 within the interior of the cylindrical member 66 and also serves to retain the hydraulic ram 150 in a vertical position relative to the shell 80. The hydraulic ram 150 is specifically a twenty ton PORTA-POWER (TM) hydraulic press. When actuated, the abutment end 152 will move downwardly so as to push the liner bolt 130 from the shell 80 and outwardly of the liner plate 138. Since the arms 16 and 18 are rigidly affixed to the liner bolts 140 and 146, respectively, the ram forces will be applied in a direction toward the liner bolt 130.

The present invention also includes the method of removing the liner bolt 130 from the SAG mill 132. As can be seen, the SAG mill 132 has a plurality of liner plates 138 positioned therewithin. Each of the liner plates 138 has a plurality of liner bolts extending through the shell 80. The method of the present invention includes the steps of affixing the ram 150 to the central strut 20 of the support member 12. The ram 150 has its abutment end 152 extending distal to the central strut 20 of the support member 12. Initially, a nut is removed from the liner bolt 130 on the exterior of shell 80. Since the liner bolt 130 is usually "stuck" in its position (because of the relationship of the bolt head 136 within the ellipsoid hole of the liner plate 138), the threaded end 134 of bolt 130 will reside in its position exterior of the shell 80. For the purposes of removing the liner bolt 130, the first arm 16 is affixed to the liner bolt 140. Similarly, the second arm 18 is affixed to the liner bolt 146. The liner bolts 140 and 146 are positioned on opposite sides of the first liner bolt 130. After the arms 16 and 18 are positioned, in this manner, the ram 150 is actuated such that the abutment end 152 pushes the liner bolt 130 from its position on the shell 80.

In normal use, the affixing of the arms 16 and 18 to the bolts 140 and 146 involves a specific procedure. Initially, the nut 142 on the second liner bolt 140 is removed. The nut 148 on the threaded end of the third liner bolt 146 is also removed. The hole 28 on the end surface 24 of the first arm 16 and the hole 30 on the end surface 26 of the second arm 18 are positioned over the ends of the second liner bolt 140 and the third liner bolt 146, respectively. The nut 142 is then threadedly affixed over the end of the second liner bolt 140 such that the end surface 24 is interposed between the nut 142 and the shell 80. Similarly, the nut 148 is threadedly secured to the end of the third liner bolt 146 such that the end surface 26 is interposed between the nut 148 and the exterior of the shell 80. As can be seen, the first liner bolt 130, the second liner bolt 140 and the third liner bolt 146 are circumferentially aligned on the shell 80.

After the abutment end 152 of the hydraulic ram 150 has pushed the first liner bolt 130 from the shell 80, it is necessary to remove the first arm 16 and the second arm 18 from the corresponding liner bolts 140 and 146. The support member 12 can then be moved to another position on the shell 80 such that the abutment end 152 will be adjacent to a different liner bolt than the first liner bolt 130. In order to remove the support member 12 from its position on the shell 80, it is necessary to remove the nut 142 from the second liner bolt 140 and remove the nut 148 from the third liner bolt 146. After this has been accomplished, a hoist can be attached to the eyelet 38 so as to lift the support device from the bolts 140 and 146. A hoist can then be used so as to move the support device 12 and the associated ram 14 to another location on the shell 80.

The device and method of the present invention effectively eliminates the previous problems associated with the manual removal of the liner bolts from the SAG mill. When the present invention is used in conjunction with a twenty ton hydraulic press, the liner bolts can be easily punched through both the accumulated debris and the peened bolt holes. The set up of the device 10 of the present invention requires a mobile floor-mounted or overhead crane of approximately two and a half ton capacity. The crane supports the tool as it is being aligned on the bolt to be punched. The bolts in line circumferentially, are used to secure the device 10 and to provide a leverage point against the hydraulic press. The liner bolt nut is removed from the liner bolt to be punched. The hydraulic press is then positioned and the ram is actuated. This effectively punches the bolt inwardly through the liner hole. This process is repeated over the next bolt.

In tests conducted with the present invention, it was found that all of the bolts on the SAG mill could be removed by this hydraulic punching technique. The entire plate liner replacement job for the entire SAG mill required only 38 hours of down time to accomplish this purpose. Since no welding took place, there is no ventilation or fume concerns. Additionally, no manpower was required or specialized techniques required, for liner plate enlargement. As such, the present invention allows for the effective removal of the liner bolts from the SAG mill.

The foregoing disclosure and description of the invention is illustrative and explanatory thereof. Various changes in the details of the illustrated configuration, or in the step of the described method, may be made within the scope of the appended claims without departing from the true spirit of the invention. The present invention should only be limited by the following claims and their legal equivalents.

I claim:

1. A device for removal of a liner bolt from a SAG mill comprising:

a support means for affixing to an exterior surface of the SAG mill; and a ram means affixed to said support means, said ram means having an end movable relative to said support means, said end for compressive abutment with a surface of the liner bolt.

2. The device of claim 1, said support means comprising:

a first arm;

a second arm; and a strut connected to said first and second arms, said ram means affixed to said strut.

3. The device of claim 2, said first arm extending outwardly at an obtuse angle from said strut, said second arm extending outwardly at an obtuse angle from said strut.

4. The device of claim 2, further comprising:

a first bolt receptacle means formed on an end of said first arm, said first bolt receptacle means for removable attachment to a second liner bolt of the SAG mill; and a second bolt receptacle means formed on an end of said second arm, said second bolt receptacle means for removable attachment to a third liner bolt of the SAG mill.

5. The device of claim 4, said first bolt receptacle means having a first hole formed on a surface at an end of said first arm, said second bolt receptacle means having a second hole formed on a surface at an end of said second arm, said first and second holes being symmetrically positioned relative to said ram means.

6. The device of claim 5, said surfaces of said first and second arms being inclined so as to conform to a circumference of the SAG mill.

7. The device of claim 5, each of said first and second holes having an ellipsoid configuration.

8. The device of claim 2, said strut positioned between respective ends of said first and second arms, said strut being a horizontal member.

9. The device of claim 2, further comprising:

an eyelet affixed to and extending outwardly from at least one of said first and second arms.

10. The device of claim 2, said ram means comprising:

a cylindrical member affixed to said strut and extending vertically downwardly therefrom, said cylindrical member positioned generally centrally between said first and second arms; and a hydraulic ram having a body received within said cylindrical member, said hydraulic ram having said end extending outwardly therefrom, said end positioned on an opposite side of said body from said strut.

11. The device of claim 1, said ram means comprising:

a cylindrical member affixed to and extending downwardly from said support means, said cylindrical member for receiving a hydraulic ram therein.

12. The device of claim 11, said ram means further comprising:

a circular frame affixed to said support means, said cylindrical member being rigidly affixed to said circular frame.

13. The device of claim 11, said ram means further comprising:

a hydraulic ram having a body received within said cylindrical member, said hydraulic ram having said end extending outwardly therefrom; and a restraining means connected to said hydraulic ram, said restraining means for affixing said hydraulic ram within said cylindrical member.

* * * * *